United States Patent [19]
Buchele

[11] 3,971,199
[45] July 27, 1976

[54] BLADE GUARD FOR ROTARY LAWN MOWERS

[75] Inventor: Wesley F. Buchele, Ames, Iowa

[73] Assignee: Iowa State University Research Foundation, Inc., Ames, Iowa

[22] Filed: Oct. 11, 1974

[21] Appl. No.: 514,126

[52] U.S. Cl. ............................... 56/320.2; 56/17.4
[51] Int. Cl.² ........................................ A01D 75/20
[58] Field of Search ............... 56/320.1, 320.2, 17.4, 56/255

[56] References Cited
UNITED STATES PATENTS

| | | | |
|---|---|---|---|
| 2,906,082 | 9/1959 | Mathis | 56/320.1 |
| 3,038,289 | 6/1962 | Cross | 56/255 |
| 3,057,140 | 10/1962 | Ridenour et al. | 56/255 X |
| 3,148,490 | 9/1964 | Chadwick | 56/320.2 |
| 3,481,124 | 12/1969 | Machovina | 56/17.4 X |
| 3,568,421 | 3/1971 | Smith et al. | 56/17.4 X |
| 3,643,408 | 2/1972 | Kulak et al. | 56/17.4 |

*Primary Examiner*—J.N. Eskovitz
*Attorney, Agent, or Firm*—Zarley, McKee, Thomte & Voorhees

[57] ABSTRACT

A blade guard for rotary lawn mowers comprising a plurality of spaced apart elongated members which extend longitudinally in the intended direction of travel of the mower device. The space between the forward ends of the elongated members and the forward end of the mower cowling is open and free from obstructions to permit the grass to be sucked upwardly for cutting by the mower blade. The elongated members have varying lengths to define an effective area substantially the same as the area defined by the unsharpened center portion of the mower blade when rotating so that the sharpened ends of the blade extend outwardly beyond the effective area of the guard means. The guard means is hinged to the mower cowling to permit convenient cleaning of the mower. An ignition interlock means is also connected to the guard.

3 Claims, 5 Drawing Figures

BLADE GUARD FOR ROTARY LAWN MOWERS

BACKGROUND OF THE INVENTION

The United States Public Health Service estimates that approximately 30,000 people were injured by rotary lawn mowers in 1973. More than seventy (70) per cent of these injuries were inflicted when people came into contact with the rotary blade with the remaining 30 per cent of the injuries being inflicted by objects thrown by the blade.

Therefore, it is a principal object of the invention to provide a safety device for a lawn mower which reduces the hazards normally connected therewith.

A further object of the invention is to provide a blade guard for rotary lawn mowers.

A further object of the invention is to provide a blade guard for rotary lawn mowers which does not objectionably reduce the efficiency of the mower.

A further object of the invention is to provide a blade guard for rotary lawn mowers which shields the rotary blade in those areas most likely to cause injury to persons.

A further object of the invention is to provide a blade guard for rotary lawn mowers which is easily attached to the mower.

A further object of the invention is to provide a blade guard for rotary lawn mowers which is economical of manufacture, durable in use and refined in appearance.

These and other objects will be apparent to those skilled in the art.

BRIEF DESCRIPTION OF THE DRAWINGS

This invention consists in the cconstruction, arrangements, and combination of the various parts of the device, whereby the objects contemplated are attained as hereinafter more fully set forth, specifically pointed out in the claims and illustrated in the accompanying drawings, in which:

SUMMARY OF THE INVENTION

Figure 1:
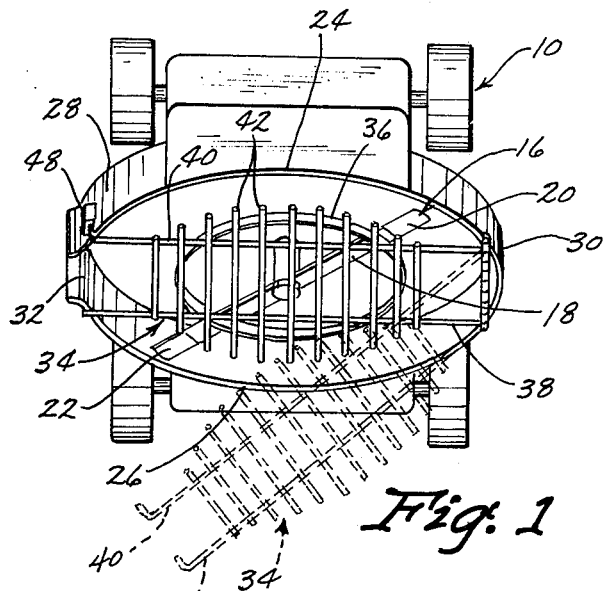
FIG.1 is a bottom perspective view of the blade guard mounted on the mower.
Figure 4:
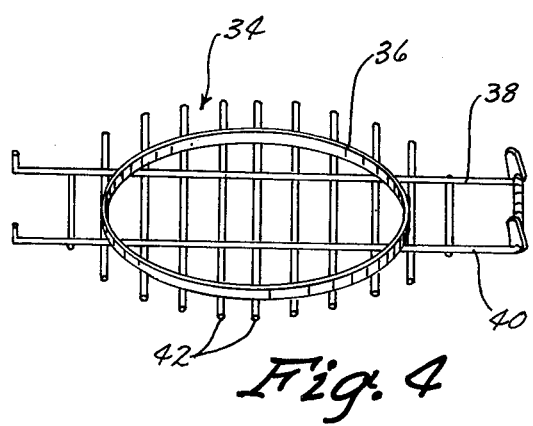
FIG. 4 is a perspective view of the blade guard.
Figure 2:
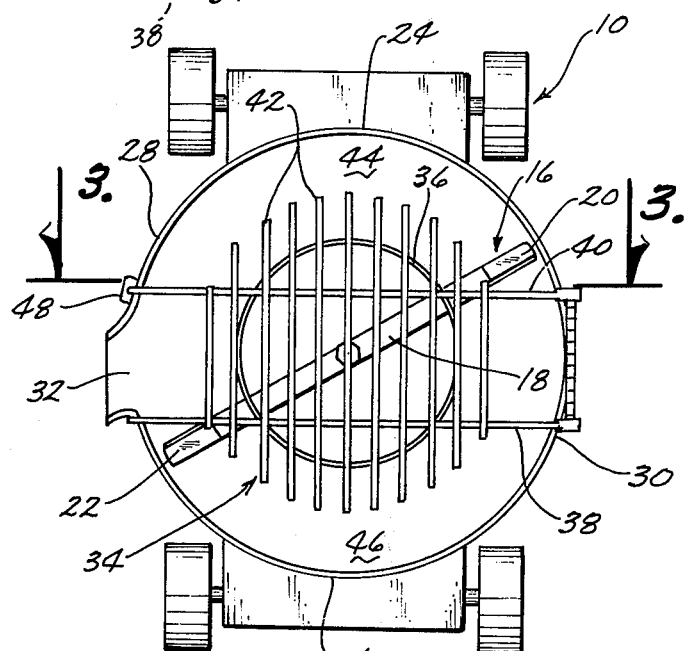
FIG. 2 is a bottom view of the mower having the blade guard of this invention attached thereto.
Figure 5:
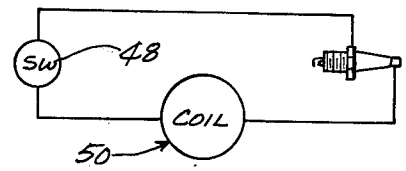
FIG. 5 is a schematic view of the ignition circuitry of the mower.
Figure 3:
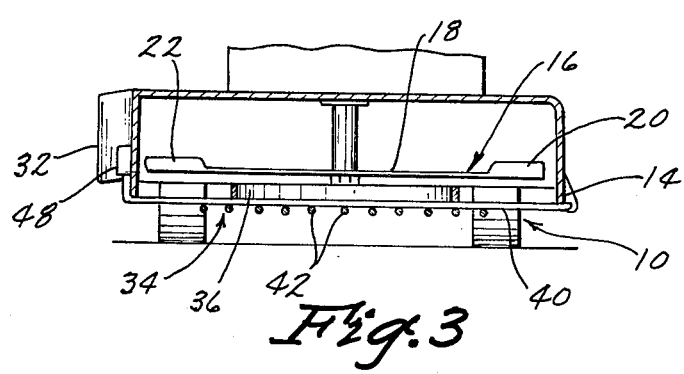
FIG. 3 is a sectional view seen on lines 3 — 3 of FIG. 2.

A blade guard for a rotary lawn mower comprising a plurality of spaced apart rods or bars which are positioned beneath the mower cowling and approximately flush with the lower edge thereof. The space between the forward ends of the bars and the forward portion of the mower cowling is open and free from obstructions so that the grass may be drawn upwardly therebetween for cutting by the rotating blade. The lengths of the bars are varied to define an effective area substantially the same as the area defined by the unsharpened center portion of the blade when rotating so that the unsharpened ends of the blade extend outwardly beyond the effective area of the guard means.

DESCRIPTION OF THE PREFERRED EMBODIMENT

The numeral 10 refers generally to a conventional lawn mower generally comprising a cowling 12 having a substantially horizontally disposed lower edge 14. A horizontally diposed blade 16 is suitably rotatably mounted on the lawn mower and is driven by any conventional power means such as an engine or the like. Blade 16 generally comprises an unsharpened center portion 18 and sharpened end portions 20 and 22. For purposes of description, the cowling 12 will be described as having a forward end 24, rearward end 26, and opposite sides 28 and 30. A discharge spout 32 is provided in side 28.

The blade guard of this invention is referred to generally by the reference numeral 34 comprising generally a guard ring 36, laterally extending supports 38 and 40 and elongated members 42. The elongated members 42 are secured to the supports 38 and 40 in a spaced apart relationship to permit the grass to be sucked upwardly therebetween by the updraft created by the rotating blade.

As seen in the drawings, the space 44 between the forward ends of the elongated members and the forward end of the cowling is open and free from obstructions to permit the grass to be sucked upwardly by the rotating blade as the mower is moved forwardly with respect to the grass.

The elongated members 42 have varying lengths to define an effective area substantially the same as the area defined by the unsharpened center portion of the blade when rotating so that the sharpened ends of the blade extend outwardly beyond the said effective area of the guard means as clearly shown in the drawings. The drawings illustrate that the rear cutting area 46 is open but it should be understood that the rearward ends of the elongated members 42 can extend completely to the rear portion of the cowling if desired to prevent "back-over" accidents.

The support members 38 and 40 are hingedly secured to the housing so that the guard means may be pivotally moved to an open condition relative to the cowling to permit the interior of the cowling to be easily cleaned. Suitable fastening means is provided on the guard means for maintaining the guard means in its closed position as desired. The numeral 48 refers generally to an ignition interlock means which shorts the engine ignition system 50 when the guard is moved to its open position.

In operation, the guard device partially protects the blade in order to reduce the accident rate by reducing the amount of exposure of the blade. The guard is positioned beneath the rotating blade and is substantially flush with the lower edge of the cowling. The guard ring 36 is provided to prevent the blade from striking the guard when the guard is deflected upwardly as would occur when the device is riding over a rock. The guard ring presses against the unsharpened portion of the blade which prevents the blade from striking the elongated members of the guard. In other words, the blade simply rotates upon the guard ring 36 to prevent damage to the guard when the guard moves over a rock or the like.

As the mower is moved over the grass, the grass is sucked upwardly in the space 44 and is cut by the sharpened portion of the blades. If the open space 46 is provided, the grass is also cut in that area. The elongated members substantially reduce injury to persons using the mower since they extend over the sides of the underside of the cowling where injuries most often occur.

Thus it can be seen that the blade guard accomplishes at least all of its stated objectives.

I claim:

1. In a mower device,
a wheel-supported mower cowling having an open bottom,
a horizontal elongated cutting blade disposed within said cowling, said blade having sharpened cutting ends and an unsharpened center portion,
means operatively secured to said cowling for supporting and rotating said blade,
guard means secured to and covering the open bottom of said cowling, said guard means including a plurality of spaced apart elongated members extending longitudinally in the intended direction of travel of said mower device, the space between the forward ends of said elongated members and the forward end of said cowling being open and free from obstructions, the forward ends of said elongated members being disconnected with the spaces therebetween being free from obstructions, said elongated members having varying lengths to define an effective area substantially the same as the area defined by the unsharpened center portion of said blade when rotating so that the sharpened ends of said blade extend outwardly beyond the said effective area of said guard means.

2. The device of claim 1 wherein said guard means comprises a support means secured to said cowling, a guard ring mounted on said support, said elongated members being positioned below said guard ring, said guard ring adapted to engage the unsharpened portion of said blade to prevent said elongated members from being struck by said blade upon said elongated members being deflected upwardly relative to said blade.

3. The device of claim 1 wherein said guard means is hingedly secured to said cowling and is movable between closed and open positions, and ignition interlock means for deactivating the means for rotating said blade when said guard is moved from its closed position.

* * * * *